United States Patent [19]

Grabovac et al.

[11] Patent Number: 5,099,678
[45] Date of Patent: Mar. 31, 1992

[54] TORQUE TOOL CALIBRATING MACHINE

[75] Inventors: Bosko Grabovac, Arcadia; Zlatko Kurtovic; Jadranka Kurtovic, both of Walnut, all of Calif.

[73] Assignee: Consolidated Devices, Inc, City of Industry, Calif.

[21] Appl. No.: 559,667

[22] Filed: Jul. 30, 1990

[51] Int. Cl.$^5$ .............................................. G01L 25/00
[52] U.S. Cl. ........................................ 73/1; 73/862.08
[58] Field of Search ........................... 73/862.08, 1 C; 74/411.5; 81/473, 474, 475, 476

[56] References Cited

U.S. PATENT DOCUMENTS

| | | | |
|---|---|---|---|
| 2,706,903 | 4/1955 | Livermont | 73/862.08 X |
| 3,364,725 | 1/1968 | Grabovac | 73/1 C |
| 4,470,312 | 9/1984 | Thompson | 73/862.08 |

*Primary Examiner*—Charles A. Ruehl
*Assistant Examiner*—E. L. Shopbell
*Attorney, Agent, or Firm*—Georges A. Maxwell

[57] ABSTRACT

A Torque Tool Calibrating Machine comprising an elongate torque tool engaging transducer including a strain gauge and mounted on a turning axis; an electronic analyzer connected with the gauge and operating to analyze, translate and display the voltage drop across it in torque force units and to emit a control voltage when it operates to display a predetermined maximum units of force, a manually driven gear transmission to turn the transducer including drive and driven gear wheels, a turntable supported on said turning axis and coupled with the transducer, an elongate lever arm projecting radially from the turntable and drivingly coupled with the transmission to selectively rotate the arm, table and transducer clockwise and counterclockwise, and a locking mechanism selectively operable to lock one of the gears against clockwise or counterclockwise rotation and including solenoid-acutated latch units with pawls that engage the gear when the solenoids are energized; a controller circuit connected between the analyzer and the units and directing operating currents through the solenoids when the analyzer emits a control voltage.

12 Claims, 3 Drawing Sheets

TORQUE TOOL CALIBRATING MACHINE

PRIOR ART

Torque Tool Calibrating Machines of the character here concerned with, but without locking means to automatically stop operation of the machines when excessive forces are encountered, are old in the art.

Novelty in the present invention resides in the incorporation of locking means in an old torque tool calibrating machine that establishes a new combination and relationship of parts having a new rule of action.

To the best of our knowledge and belief, the subcombination of parts comprising our new locking means is itself patentably novel. We know of no prior art teaching of solenoid-actuated latching devices including gear teeth engaging ratchet pawls, such as we provide.

BACKGROUND OF THE INVENTION

In the art of testing torque wrenches, it is common practice to provide special machines in and with which torque wrenches to be tested and/or calibrated (adjusted) can be easily and conveniently engaged and that operate to direct operating forces onto and through the wrenches in an accurate and prescribed manner and that enable the operators of the machines to determine the accuracy of and to adjust or calibrate the wrenches.

Torque wrenches that can be tested and calibrated in such machines vary widely in details of construction. Such wrenches characteristically include elongate lever arms with front and rear ends; hand grips at the rear ends of the lever arms; work-engaging heads projecting radially from the other or front ends of the lever arms; and, force-indicating means that serve to advise the operator of the wrenches of the torsional forces conducted by the heads onto related work. The work-engaging heads for such wrenches are, most often, polygnal members that are engageable in polygonal openings in work parts or related tools, such as drive sockets.

At the time of manufacturing torque wrenches, their forceindicating means are calibrated, adjusted and set so that the wrenches are accurate when first put to use. During normal use of such wrenches, they tend to become maladjusted and must be periodically tested for accuracy and recalibrated when that is required.

To effectively test and calibrate torque wrenches, the prior art has provided several different kinds of torque wrench calibrating machines in and with which torque wrenches can be easily and conveniently engaged and that function to operate the wrenches in a prescribed manner and to accurately indicate those forces that are directed onto and through the wrenches. Those forces that are indicated by the calibrating machines (called calibrating forces) are compared with those forces that are indicated by the force-indicating means of the wrenches (called calibrated forces). If the calibrating and calibrated forces are not the same, the force-indicating means of the wrenches are suitably adjusted and set so that they are the same.

In the past, torque calibrating machines of the character referred to above were rather simple mechanical devices with input shafts with which the tool-engaging heads of wrenches to be tested were engaged and that included force-indicating means that operated to indicate the torsional forces directed by the wrenches onto the shafts. The wrenches were manually turned to effect testing thereof. Due to the inability of skilled operators of those old machines to accurately apply forces onto and through the wrenches, the dependability and accuracy of those old machines was determined to be wanting. That is, the forces manually applied to the wrenches were often misdirected and shakely, wobbly or otherwise unsteady.

As a result of the above, new, more accurate and dependable torque calibrating machines have been developed and are now in use. These new machines include electromechanical load cell transducers with which the work-engaging heads of wrenches to be tested are drivingly coupled; stop means that engage the handles of the wrenches in a prescribed manner; and, drive means to deliver work forces onto and through the wrenches in a steady and prescribed manner. In some instances, the drive means operate to pivot the arms of the wrenches about the pivotal axes of their work-engaging heads to torque the transducers and in which case the transducers are reaction parts for the wrenches. In other instances, the stop means engaging the handles of the wrenches and the drive means operate to rotate the tranducers, in which case the wrenches are reaction parts for the transducers. For practical reasons, it is preferred that the wrench lever arms be held stationary and that the transducers be rotated. In either case, when testing wrenches with such calibrating machines, parts of both the wrenches and the machines are yieldingly biased and are, in effect, spring-loaded. As a result of the spring loading of parts, the assemblies of parts tend to vibrate, reciprocate, recoil or otherwise work in an adverse fashion if steps are not taken to prevent such working of parts. To this end, the prior art has resorted to the use of manually driven gear transmissions characterized by manually-engageable hand wheels or cranks at their work-input ends and the output ends of which are suitably mechanically coupled with those parts of the machines that direct forces onto and through the wrenches. The transmissions afford great mechanical advantage to the operator of the machines and enables the operators to apply great forces into and through the machines and the wrenches related thereto in a slow, positive and steady fashion.

In addition to the foregoing, the transmissions include screw gears with follower nuts at their power output ends and that serve to lock the transmissions when the screw gears are not turned and to thereby prevent those parts worked upon and biased by the transmission from reciprocating and/or recoiling in a manner that is likely to adversely effect operation of the machines.

While those calibrating machines of the prior art that include transducers and transmissions of the general character referred to above are highly effective and dependable when put to careful and proper use, there is no sense of feel between the input and output ends of the transmissions and no sense of the forces directed onto and through the transducers. As a result, the forces directed onto and through the transducers can easily and quickly exceed the structural and functional limits of the transducers, causing irreparable damage thereto. Such damage to the transducers, however slight, renders the machines defective and/or undependable and is seldom noticed until such time as the transducers are themselves tested by other, separate and independent testing equipment.

As a result of the susceptibility of the above-noted kinds of calibrating machines to be damaged by overstressing the transducers thereof, those who own and maintain such calibrating machines have found it to be necessary that access to and use of those machines be restricted and carefully monitored in order to avoid the likelihood that unskilled and careless hands will cause irreparable and costly damage to the machines.

As a result of the foregoing, the testing and calibrating of torque wrenches is, most often, a specialized activity that is slow and inconvenient to perform and that often fails to attain full potential use of the calibrating machines.

OBJECTIVES AND FEATURES OF THE INVENTION

It is an object of this invention to provide an improved torque wrench calibrating machine that is such that it cannot be operated to overstress parts thereof when put to its regular and intended use.

It is another object and a feature of the invention to provide a calibrating machine of the general character referred to above that includes a manually driven transmission with screw and wheel gears and that includes a novel electromechanical locking means that operates to releasably lock and prevent advance turning of the gears of the transmission when a predetermined maximum force is applied by the transmission to the parts of the machine driven thereby.

Yet another object and feature of the intention is to be provide a novel locking means of the general character referred to that is a racheting machanism that operates to stop advance turning of the gears of the transmission while allowing for substantial free reverse turning of the gears.

Still another object and feature of the invention is to provide a novel locking means of the general character referred to above that allows for clockwise and counterclockwise advance turning of the gears.

A further object and feature of the invention is to provide a novel locking means of the general character referred to above that includes a pair of spring-loaded gear wheel engaging pawls, one of which pawls is engageable with a gear to stop clockwise advance turning thereof and the other of which is moveable to engage and stop counterclockwise engagement of the gear wheel; and, each of which pawls allows for reverse turning of the gear wheel when it is moved into engagement therewith.

It is an object and feature of the invention to provide a novel lock means of the character referred to above that includes a solenoid related to each pawl and that is selectively operable to move the pawl into and out of stopping engagement with the gear wheel.

It is an object and a feature of the invention to provide a novel stop means for a calibrating machine of the general character referred to above wherein the transducer of the machine is connected with an electric circuit that translates the electrical resistance afforded by the transducer into readable force units and that includes a control circuit that functions to selectively direct operating current to one or the other of the solenoids of the locking means when the resistance afforded by the transducer corresponds with a predetermined set maximum torsional force directed through the transducer.

Finally, it is an object and feature of the invention to provide a stop means of the general character referred to above that is easy and economical to make, install and maintain and a means that is highly effective and dependable in operation.

The foregoing and other objects and features of the invention will be apparent and will be fully understood from the following detailed description of a preferred embodiment of the invention throughout which description reference is made to the accompanying drawings.

DETAILED DESCRIPTION OF THE INVENTION

Figure 1:
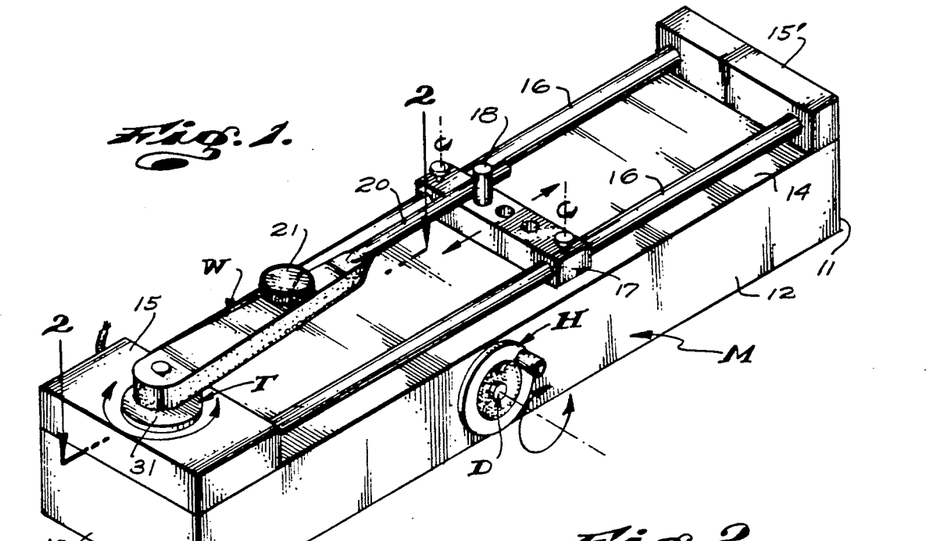
FIG. 1 is an isometric elevational view of a calibrating machine embodying the invention.

FIG. 1 shows a calibrating machine M with a torque wrench W engaged with it.

The machine M is an elongate horizontal unit with longitudinally spaced front and rear end walls 10 and 11, laterally spaced opposite side walls 12, a support-engaging bottom wall 13, and a top wall 14. The walls 10, 11, 12 and 14 are parts of a housing structure that occurs about an inner steel frame structure F of which the bottom wall 13 is a part. Other parts of the frame structure F are shown and will be referred to in the following. Upwardly projecting support structures 15 and 15', including parts of the frame structure F occur at the front and rear end portions of the top wall 14. The structures 15 and 15' support a pair of elongate longitudinally extending laterally spaced rails 16. The rails 16 slidably carry a transversely extending car 17 with at least one upwardly projecting reaction post 18. The reaction post 18 occurs at one side of a handle 20 on the wrench W to stop lateral movement or turning of the handle (and the wrench) in a direction toward the post. The handle 20 of the wrench can be arranged to occur on either side of the post 18 to stop clockwise or counterclockwise turning of the wrench, as circumstances require. The car 17 can be adjusted and set longitudinally of the rails to accommodate wrenches of different lengths and the lateral position of the post 18, on the car, can be adjusted, as circumstances might require.

The front end of the wrench W has a downwardly projecting work-engaging head (not shown). The head can vary widely in form but in most instances is a polygonal (square) post-like force-transmitting part adapted to be entered into a mating polygonal opening in a piece of work, drive socket or other part that is to be turned or otherwise worked upon by the wrench.

In the case illustrated, the wrench W includes a force-indicating dial 21 that is mechanically connected with the head, as by a deflection beam and clock works, within the wrench structure and that indicates the forces that are delivered by the wrench, through its work-engaging head, onto a piece of work.

The wrench W illustrated and described above is but one of a considerable number of different kinds or types of torque wrenches that are in common use and that can be advantageously related to and worked upon by the calibrating machine M.

The machine M next includes a torque transducer T within and accessible at the top of the structure 15 at the front end of the machine. The transducer T is a common form of torque transducer and is characterized by an elongate vertical cylinder case 25 with upper and lower ends 26 and 27. The transducer has a radially outwardly projecting mounting flange at its lower end. The transducer includes a central vertically extending torque shaft 29, shown in dotted lines in FIG. 4 of the drawings. The shaft 29 has a lower end anchored in the case and an upper end that is accessible at the upper end of the case. One or more strain gauges (not shown) are fixed to the torque shaft between its ends and within the case. The strain gauges (resistor devices) 32 are connected with a remote electrical circuit by conductor lines that exit the case, substantially as shown, and that extend from the machine M to the remote electrical circuit, in accordance with common practices.

The upper end of the shaft 29 is adapted to be drivingly engaged or coupled with a torque wrench and to be torsionally deflected thereby. When the shaft is torsionally deflected, the gauges are also biased or deflected to alter their electrical resistance. The resistance of the gauges corresponds to the applied torsional forces directed through the shaft and is translated into readable force measurements by the electrical circuit.

In the case illustrated, the transducer T is shown provided with an adapter plate mounting flange 30 at the upper end of the case. The flange 30 carries an annular adapter plate 31 that rotatably carries, a coupling that couples with the shaft 29 and that has a polygnal drive opening 33 to cooperatively receive the work-engaging head of the wrench W. Several adapter plates can be provided to accommodate different configurations of work-engaging heads and the like.

The machine M next includes a flat horizontal upwardly disposed turntable R immediately below and in supporting and rotary driving engagement with the lower end of the transducer T. The mounting flange 28 of the transducer T is shown pinned to and releasably fastened to the turntable R to establish positive rotary-driving engagement therebetween and to facilitate replacement of the transducer with transducers of like construction that are constructed to handle different ranges of forces.

The capability of using different transducers enables the machine to be easily and conveniently made to handle and work within a substantial number of different ranges of force without otherwise altering or modifying the machine.

Figure 4:
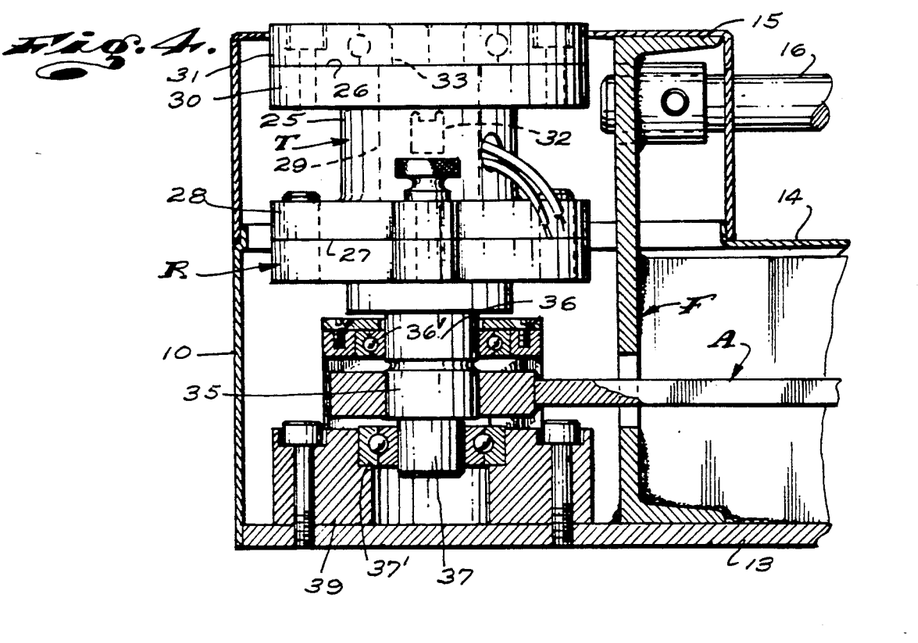
FIG. 4 is an enlarged cross-sectional view taken substantially as indicated by Line 4—4 on FIG. 2.

The turntable R has a central depending support shaft 35 with vertically spaced upper and lower journals 36 and 37. The shaft depends into a journal box 39 that is securely fastened to the bottom wall 13 of the machine and that carries upper and lower anti-friction bearings 36' and 37' that engage the journals 36 and 37 and rotatably support the shaft and the turntable, substantially as illustrated in FIG. 4 of the drawings.

Figure 2:
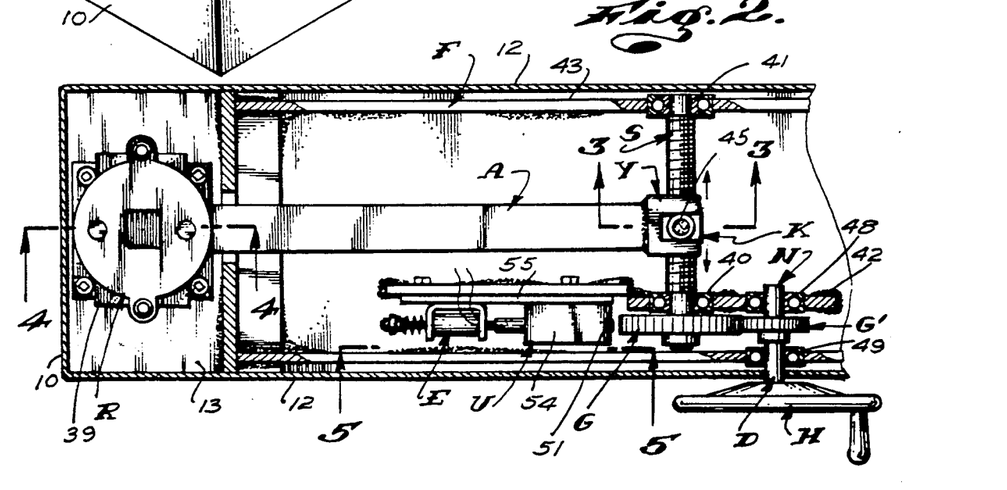
FIG. 2 is an enlarged detailed sectional view of a portion of the machine, taken substantially as indicated by Line 2—2 on FIG. 1.
Figure 3:
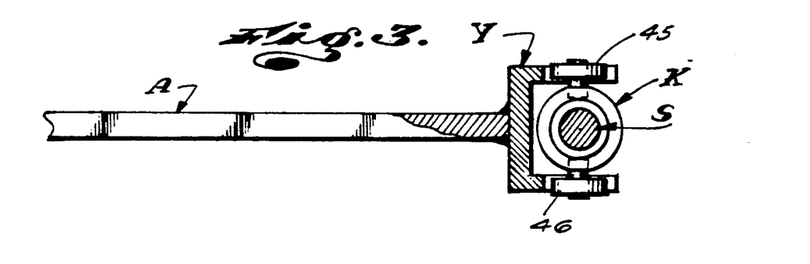
FIG. 3 is an enlarged detailed sectional view taken as indicated by Line 3—3 on FIG. 2.

The machine M next includes an elongate lever arm A with front and rear ends. The arm A extends longitudinally of the machine. The arm has a front end drivingly connected with the central portion of the support shaft 35, between the journals 36 and 37. The rear end of the lever arm terminates in the central portion of the machine, as clearly shown in FIG. 2 of the drawings.

It will be apparent that upon moving the rear end of the lever arm laterally within the machine the turntable R and transducer T are turned or rotated and the head of the wrench engaged with the transducer rotates therewith, causing the wrench W to function substantially as intended, but in a reverse fashion; that is, the wrench is actuated by work forces applied onto its work-engaging head rather than by work forces directed onto its handle.

It is to be understood and it is believed to be apparent that the details of the structure thus far described can vary widely without affecting or in any way departing from the spirit and the broader aspects of the invention.

The machine M next includes a manually operable transmission N that is operable to selectively swing the rear end of the lever about the central vertical axis of the turntable laterally within the machine, arm A. The transmission N includes an elongate horizontal screw gear S that extends laterally of the machine with its central portion occurring in close proximity to the rear end of the arm A. The opposite ends of the screw gear (screw) are rotatably supported by anti-friction bearings 40 and 41 carried by suitable mounting plates 42 and 43, substantially as shown. The plates 42 and 43 are parts of the frame structure F. The screw S is threadedly engaged through and carries a follower nut K. The nut K is engaged with and held against rotation with the screw by a yoke Y fixed to the rear end of the arm A.

The yoke Y has a vertical base fixed to the rear end of the arm and has upper and lower bifurcated legs that occur above and below the nut K and the screw S. The bifurcated arms define laterally spaced rearwardly projecting fingers. The nut carries upper and lower anti-friction bearings 45 and 46 on vertical axes. The bearings 45 and 46 have outer races or race rings that are in free running and sliding engagement with and between the fingers of their related upper and lower arms of the yoke.

With the above relationship of parts, it will be apparent that upon turning of the screw S the nut K is held against rotation with the screw by the yoke Y and that the screw, when rotated, works to advance the nut longitudinally of the screw and to thereby move the rear end of the arm laterally and to turn the turntable, transducer and work-engaging head, as noted above.

At this time, it is important to note that when the screw S is stationary the nut K is, in effect, locked in place longitudinally of the screw. That is, turning forces applied to the lever arm A and directed axially of the screw S, through the nut, K will not result in axial movement of the nut relative to the screw. The nut will only move axially of the screw when the screw is rotated. Thus, the screw and nut assembly effectively stop or prevent any recoiling or reciprocating of the lever arm A, support shaft 35, turntable R, transducer T and related torque wrench parts during use and operation of the machine.

The transmission N of the machine M next includes a spur gear train comprising a large diameter drive gear G at one end of the screw gear or screw S and a small diameter drive gear G' on a driven shaft D and engaged with the gear G. The driven shaft D is carried by anti-friction bearings 48 and 49 substantially as shown and has an outer free end that projects laterally outward from within the machine. The outer free end of the driven shaft D carries a manually engageable hand wheel H or the like. The wheel H can be easily and conveniently manually engaged and turned, clockwise or counterclockwise, to turn the screw S clockwise or counterclockwise and to thereby move the nut K and the rear end of the arm A laterally of the machine to effect clockwise or counterclockwise turning of the turntable R, transducer T and work-engaging head of the wrench W.

It is to be noted that the mechanical advantage afforded by the gears G and G' together with the mechanical advantage afforded by the screw S and the lever arm A affords great mechanical advantage between the hand wheel H and the transducer T and that little applied turning force on the hand wheel results in the directing of great turning forces on and through the transducer.

No forces on and between the parts between a work-engaging head of the wrench W and the screw S is conducted through the transmission in a manner that it can be sensed by the operator (person) of the machine, at the hand wheel 50. Accordingly, by inadvertent turning of the hand wheel H a bit too far, the operator can easily and unwittingly cause excessive and damaging forces to be directed into and through the transducer T.

The machine M next includes novel locking means L that operate to lock one of the spur gears G or G' against rotation when the turning forces directed onto and through the transducer T reach a predetermined and set maximum operating force for the transducer.

In the case illustrated, the means L is related to the driven gear G. The means L includes a first latch unit U that operates to stop advance turning of the gear G in a clockwise direction and a second latch unit U' that operates to stop advance turning of the gear G in a counterclockwise direction.

Each latch unit U and U' includes an elongate pawl 50, the longitudinal axis of which is substantially normal to the turning axis of the gear G. Each pawl 50 is positioned radially outward from the gear G and has an elongate cylindrical in cross-section bolt portion with radially inwardly and outwardly disposed ends (relative to the gear G) and a radially inwardly project tooth-like catch 51 at its inner or front end. The catch 51 is shiftable radially inwardly and outwardly into and out of latched engagement between adjacent teeth 52 of the gear, when the pawl is shifted radially inwardly from an unactuated position to an actuated position and thence shifted outwardly or back to said unactuated position.

The bolt portion of each pawl is slidably engaged in a related cylindrical in cross-section guide opening 53 in a mounting block 54. The block 54 is mounted on a mounting plate 55 that is mounted on a part of the frame structure F, substantially as shown. Each latch unit of the means L next includes an elongate solenoid E that is spaced radially outward from and in axial alignment with the pawl 50. The solenoid for each latch unit is mounted on the mounting plate 55 and has an axially shiftable spring-loaded armature 56 with a radially inwardly disposed working end. The armature 56 normally occurs in an outer, rear, unactuated position (when the solenoid is not energized) and shifts to an inner, forward, actuated position, toward the gear G, when the solenoid is energized.

Each latch unit next includes a spring-loaded lost-motion coupler 60 between the rear or outer end of the bolt portion of the pawl and the front or inner end of the armature 56 of the solenoid. The coupler 60 operates to normally yieldingly urge and hold the pawl 50 in a normal forward position axially of the armature and is such that the pawl can be yieldingly moved axially outward relative to the armature when the pawl is urged radially outward by a gear tooth 52 on the gear G, as will hereinafter be described.

The coupler 60 of each latch unit includes an cylindrical in cross-section tubular sleeve 61 connected with and projecting (axially) radially inward from the armature 56 and slidably engaged in its related guide opening 53, radially outward from the pawl 50; and, a rod 62 on and projecting radially outward from the pawl and slidably entered into the sleeve. The sleeve 61 and the rod 62 are held against rotation in the guide opening and relative to each other by suitable guide means that can, in practice, vary widely in construction. In the case illustrated, the guide means includes a first guide pin 65 carried by the block 54 and slidably engaged in an elongate longitudinally extending, radially inwardly and outwardly opening guide slot 66 in the sleeve 61; and, a second guide pin 67 on the rod 62 and entered into the slot 66.

In the form of the invention illustrated, the radially outer end of the sleeve is closed by a stem on the radial inner end of the armature. A stem (shown in phatom lines in FIG. 5 of the drawings) on the armature is threaded into the sleeve.

The means 60 next and finally includes an elongate compression spring 68 arranged within the sleeve in reactive engagement between the closed end of the sleeve and the radially outwardly disposed end of the rod 62. The spring normally yieldingly urges and holds the rod and the pawl in a normal forward or inner position relative to the sleeve and the armature. The first pin 65 carried by the lock and entered in the slot 66 allows radial inward shifting of the armature, sleeve and pawl assembly relative to the block 54 and relative to the gear G when the solenoid is energized and the latching unit is actuated. The second pin 67 carried by the rod and entered into the slot normally holds the rod and pawl in normal working position relative to the sleeve and armature, preventing forward axial displacement of the rod from within the sleeve while allowing for radial outward shifting of the rod and pawl in the sleeve and relative to the gear, when the armature, sleeve, rod and pawl assembly is in its inner actuated position.

Figure 5:
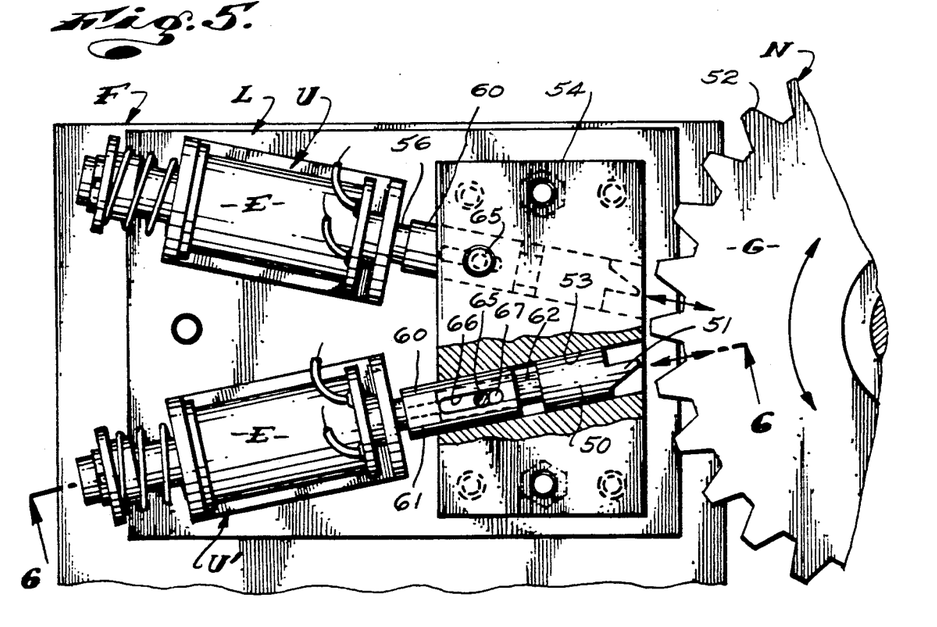
FIG. 5 is an enlarged view taken on Line 5—5 on FIG. 2.
Figure 6:
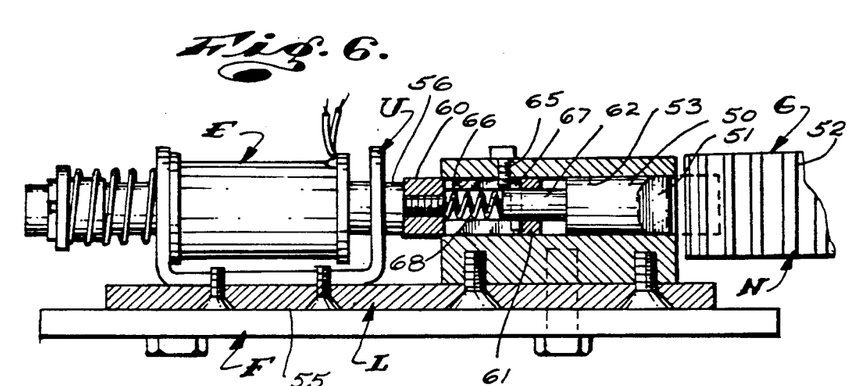
FIG. 6 is a view taken as indicated by Line 6—6 on FIG. 5.

As shown in FIG. 5 of the drawings, the locking means L is positioned at the left side of the gear G; the latch unit U is position above the latch unit U' and the longitudinal axes of the two latch units converge radially inward toward the axis of the gear. The catch 51 on the pawl 50 of each unit U is a wedge-shape part with a straight inner edge that is on a axis parallel with the central axis of the gear. The catch has a flat (substantially downwardly disposed) radially extending stop surface that occurs on a plane that is substantially parallel to the advancing flank of an adjacent tooth 52 on the gear G when the gear turns clockwise. The catch next includes a substantially upwardly disposed cam force on a plane that diverges radially outward from the stop force and that is angularly related to the advancing flank of an adjacent tooth 52 when the gear is turned counterclockwise and such that the catch is moved radially outward by that tooth. Thus, the pawl of the unit U is a clockwise ratchet pawl. The pawl of the unit U' is a counterclockwise ratchet pawl.

The latch units U and U' are selectively actuated to stop advance clockwise or advance counterclockwise turning of the gear while allowing for substantially free reverse turning of the gear.

It is to be particularly noted that in practice the latching units U and U' of the locking means L are actuated to stop advance turning of the gear G, in either a clockwise or counterclockwise direction, when excessive forces are directed onto and through the transducer T of the machine, which excessive forces are likely to cause irreparable damage to the transducer. The means L will continue to stop advance turning of the gear until the excessive or actuating force directed onto and through the transducer T is reduced to a safe amount. To reduce the force applied onto and through the transducer, it is necessary that the transmission be manually turned in a reverse direction and that the pawl of the actuated latching unit ratchets to allow for reverse turning of the gear.

It is also to be noted that the machine M, to meet existing standards and specifications for torque wrench calibrating machines, must be capable of effectively testing and/or calibrating wrenches when operated to apply torque in both clockwise and counterclockwise directions. Accordingly, it is necessary that the locking means L includes the two noted latching devices U and U'.

Figure 7:
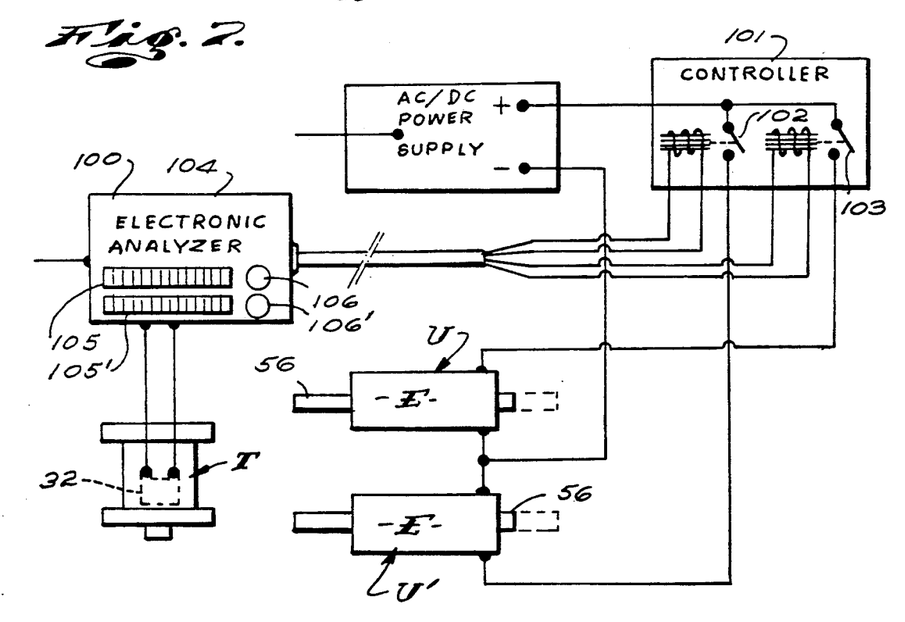
FIG. 7 is a block diagram of an electric circuit for the machine.

The locking means L next includes an AC/DC power supply 100 and a controller 101 between the power supply 100 and the solenoids of the locking means. The controller includes two relay switches 102 and 103 connected with the power supply and each connected with one of the solenoids of the latching units, substantially as shown in FIG. 7 of the drawings. The relay switches are normally open and are actuated to close by operating currents conducted to the controller from an electronic analyzer 104. The analyzer 104 is connected with the strain gauge of the transducer T. The analyzer 104 is a standard electronic analyzing device or unit that includes its own power supply and one or more bridge circuits in and with which the strain gauge of the transducer T is connected. The analyzer 104 is shown as having a pair of LCD read-out devices 105 and 105' and a pair of manually operable adjusting knobs 106 and 106'.

In addition to possible other functions, the analyzer 104 functions to analyze the operating voltage drop across the strain gauge; compares that voltage with a reference voltage and directs a resolved voltage to one of the LCD devices where it is displayed in terms of force units, such as foot pounds of force. The analyzer can be adjusted to operate through a multitude of different ranges of forces. The analyzer includes circuit means that operates to cause an operating voltage to be directed to the controller 101 in response to a predetermined force being applied through the transducer T. That circuit is such that predetermined force can be adjusted and set as circumstances require or as desired. That predetermined force can be displayed on the other of the LCD read-out devices.

That electronic analyzer that has been used in combination with the calibrating machine M is made and sold by Consolidated Devices Inc. of the City of Industry, Calif. It is particularly suited for use in testing, analyzing and calibrating torque tools and parts thereof, such as, strain gauges and transducers. It is made of diligently selected and related circuit boards and components borrowed from one or more pieces of standard laboratory testing equipment and the like.

The machine M has been satisfactorily operated when using several available electronic testing devices instead of the analyzer 104. It is understood and believed that there exists a considerable number of other pieces of electronic equipment of similar nature that can be made to perform all of those functions that are required in the operation and use of the machine M. Accordingly, it can be said that any electronic analyzer capable of receiving and translating changes in voltage directed across the transducer T of the machine M into work force units and operating to selectively transmit operating current to the controller switches 102 and 103 for the solenoids E of the latching units U and U', when the voltage in and through the transducer corresponds to a predetermined maximum work force in and through the transducer, can be used when putting the machine M to its intended use.

In practice, the analyzer 104 is adjusted or set so that an operating current is conducted to the controller 101 when the force directed into and through the transducer T is slightly less than the true maximum force that the transducer is made to handle.

In operation of the machine M, the analyzer 104 is set to direct operating current to the controller 101 when it works to determine that a predetermined maximum or set force is directed through the transducer T. Thereafter, a torque wrench is engaged in and with the machine as shown in FIG. 1 of the drawings. Thereafter, the hand wheel on the machine is turned and the forces directed by the transmission N to and through the transducer are indicated by the analyzer. The forces indicated by the analyzer and by the force-indicating means of the wrench being tested are compared as the wheel is continued to be turned. During the foregoing operation, if the forces indicated by the wrench and by the analyzer do not match, the wrench is adjusted so that the force do match. The foregoing is continued until the full range of forces that the wrench is made to handle have been encountered, whereupon the wheel is turned in reverse until the wrench and the machine are totally unstressed and the wrench is free to be disengaged from the machine.

During the foregoing operation of the machine, if the hand wheel is turned too much or too far and the transducer T of the machine is subjected to a force than is greater than the desired maximum force, the locking means L operates to stop further advance turning of the hand wheel and operation of the machine. When the foregoing occurs, the wheel is thereafter turned in reverse to "back off" or reduce the force on and through the transducer T to a safe or desired force, at which time the locking means releases and allows the machine to be operated in its normal and intended manner.

In accordance with the above, it will be apparent that the machine A cannot be operated to overstress and damage the transducer or other parts of either the machine or the wrench being worked upon. Therefore, the machine A can be safely left to be used and operated by any person having ordinary skill without the fear of such a person damaging the machine by overstressing it. As a result of the foregoing, the machine M is less troublesome and costly to operate and maintain than other calibrating machines the operation of which must be restricted. Still further, the machine M, being such that any person or ordinary skill can operate it, it is such that it can be put to its maximum potential use.

A feature of our invention resides in placing the means L at the power inlet end of the transmission N where light forces are encountered, whereby the means L can be made small, light and inexpensively.

While we have elected to illustrate and describe our new Torque Tool Calibrating Machine related to and/or working upon torque wrenches; and, have referred to it as a Torque Wrench Calibrating Machine; it is believed to be apparent that the machine is quite suited for testing and working upon numerous other parts and devices that are subjected to applied forces. For example, by providing simple and easy-to-use fixtures, the machine can be used to direct torsional, tensile, compression and shear forces onto a multitude of items and devices to test physical characteristics thereof. For example, fixtures including lever arms coupled with the transducer T and extending laterally of the machine can selectively direct tensile and compressive forces longitudinally of the machine and onto parts of the fixtures at and carried by the car 17 of the machine with which items to be tested are related. To date, we have made fixtures for testing the torsional, tensile, compression and shear characteristics of screw fasteners and shaft parts; physical characteristics of various spring parts; and, the tensile forces applied to and/or the strength of flexible lines and cables.

It will be apparent that the means L is such that it can be related to a multitude of other force-increasing gear trains or transmissions where overloading is to be prevented or guarded against. In one test, strain gauges were applied to a portion of the screw S and connected with the electrical circuitry to cause the means L to operate when the screw S was torsionally deflected a predetermined extent (clockwise and counterclockwise). One end of the screw was extended to the exterior of the machine where it was caused to direct forces onto various pieces of work. Satisfactory results were attained.

Having described only one typical preferred form and embodiment of the invention, we do not wish to be limited to the specific details herein set forth but wish to reserve to ourselves any modifications and/or variations that might appear to those skilled in the art or which fall within the scope of the following claims.

Having described our invention, we claim:

1. A torque tool calibrating machine including an elongate torque tool engaging transducer mounted on a turning axis and that includes an elongate torque shaft and at least one strain gauge on the shaft; an electronic analyzer connected with and directing an electric current through the strain gauge and operating to analyze a voltage drop across that strain gauge, translate the voltage drop, and display changes in the voltage in torque force units and operating to emit a control signal when it operates to display a predertermined maximum units of force; a manually driven transmission to turn the transducer and including, an elongate screw gear carrying a drive nut, a train of gear wheels including a driven gear wheel connected with the screw gear and a drive gear wheel on a manually rotatable input shaft; a turntable rotatably supported on said turning axis and coupled with the transducer; an elongate lever arm with one end connected with the turntable and another end terminating near the screw gear, a yoke on said other end of the arm and engaging the nut for free axial shifting and against rotation with the screw gear; and, locking means selectively operable to look one of the gear wheels against rotation and including a solenoid-actuated latch unit with a pawl that engages the gear wheel when the solenoid is energized; a controller circuit connected with and between the analyzer and the unit and directing an operating current to the solenoid of the unit when the analyzer emits a control signal.

2. The torque tool calibrating machine set forth in claim 1 wherein the pawl is a ratchet pawl that functions to stop advance turning of the gear wheel and allows reverse turning of the gear wheel.

3. The torque tool calibrating machine set forth in claim 1 that includes two similiar latch units; one unit operates to stop clockwise advance turning of its related gear wheel and the other unit operates to stop counterclockwise advance turning of its related gear wheel.

4. The torque tool calibrating machine set forth in claim 1 that includes two similar latch units; one unit operates to stop clockwise advance turning of its related gear wheel and the other unit operates to stop counterclockwise advance turning of its related gear wheel; the pawl of said one unit is a ratchet pawl that allows for counterclockwise reverse turning of its related gear wheel when that unit is actuated and the pawl of said other unit is a ratchet pawl that allows for clockwise reverse turning of its related gear wheel when it is actuated.

5. The torque tool calibrating machine set forth in claim 1 that includes two similiar latch units; one unit operates to stop clockwise advance turning of its related gear wheel and the other unit operates to stop counterclockwise advance turning of its related gear wheel; said controller circuit operates to direct an operating current to said one unit upon clockwise advance turning of its related gear wheel and to direct an operating current to said other unit upon counterclockwise advance turning of its related gear wheel.

6. The torque tool calibrating machine set forth in claim 1 wherein the pawl of its latch unit includes an elongate axially shiftable bolt with an inner end disposed substantially radially inward toward its related gear wheel and a ratchet catch on the inner end of the bolt and shiftable into and out of engagement between adjacent pairs of teeth on the gear wheel, an elongate normally axially extended axially compressible spring-loaded coupler axially aligned with and connected between the outer end of the bolt and an inner end of the solenoid armature.

7. The torque tool calibrating machine set forth in claim 1 wherein the pawl of the latch unit includes an elongate axially shiftable bolt with an inner end disposed substantially radially inward toward its related gear wheel and a ratchet catch on the inner end of the bolt and shiftable into and out of engagement between adjacent pairs of teeth on the gear wheel, an elongate normally axially extended axially compressible spring-loaded coupler axially aligned with and connected between the outer end of the bolt and an inner end of the solenoid armature, the coupler includes an elongate sleeve part with an outer end connected with the armature, an elongate rod part with an inner end connected with the bolt and a outer end portion slidably entered into the sleeve and a compression spring in the sleeve normally yielding preventing axially inward movement of the rod relative to the sleeve.

8. The torque tool calibrating machine set forth in claim 1 wherein the pawl of the latch unit includes an elongate axially shiftable bolt with an inner end disposed substantially radially inward toward its related gear wheel and a ratchet catch on the inner end of the bolt and shiftable into and out of engagement between adjacent pairs of teeth on the gear wheel, an elongate normally axially extended axially compressible spring-loaded coupler axially aligned with and connected between the outer end of the bolt and an inner end of the solenoid armature, the coupler includes an elongate sleeve part with an outer end connected with the armature, an elongate rod part with an inner end connected with the bolt and an outer end portion slidably entered into the sleeve and a compression spring in the sleeve normally yielding preventing axially inward movement of the rod relative to the sleeve, the bolt and coupler assembly is slidably engaged in and through an opening in a carrier block part of the unit that is mounted in the machine; said rod bolt and block are pinned together for limited axial movement and against rotary movement relative to each other.

9. The torque tool calibrating machine set forth in claim 6 wherein the pawl is a ratchet pawl that functions to stop advance turning of the gear wheel and allows reverse turning of the gear wheel.

10. The torque tool calibrating machine set forth in claim 6 that includes two similiar latch units; one unit operates to stop clockwise advance turning of its related gear wheel and the other unit operates to stop counterclockwise advance of its related gear wheel.

11. The torque tool calibrating machine set forth in claim 6 that includes two similiar latch units; one unit operates to stop clockwise advance turning of its related gear wheel and the other unit operates to stop counterclockwise advance turning of its related gear wheel; the pawl of said one unit is a ratchet pawl that allows for counterclockwise reverse turning of its related gear wheel when that unit is actuated and the pawl of said other unit is a ratchet pawl that allows for clockwise reverse turning of its related gear wheel when it is actuated.

12. The torque tool calibrating machine set forth in claim 6 that includes two similiar latch units; one unit operates to stop clockwise advance turning of its related gear wheel and the other unit operates to stop counterclockwise advance turning of its related gear wheel; said controller circuit operates to direct the operating current to said one unit upon clockwise advance turning of its related gear wheel and to direct the operating current to said unit upon counterclockwise advance turning of its related gear wheel.

* * * * *